(12) United States Patent
Chang et al.

(10) Patent No.: US 9,667,883 B2
(45) Date of Patent: May 30, 2017

(54) THREE-DIMENSIONAL IMAGE SENSING DEVICE AND METHOD OF SENSING THREE-DIMENSIONAL IMAGES

(71) Applicant: EMINENT ELECTRONIC TECHNOLOGY CORP. LTD., Hsinchu (TW)

(72) Inventors: Tom Chang, Taipei (TW); Kao-Pin Wu, New Taipei (TW); Kun-Huang Tsai, Hsinchu County (TW); Shang-Ming Hung, Hsinchu County (TW); Cheng-Ta Chuang, New Taipei (TW); Chih-Jen Fang, Tainan (TW); Tseng Kuo-Tsai, Taoyuan County (TW)

(73) Assignee: EMINENT ELECTRONIC TECHNOLOGY CORP. LTD., Hsinchu (TW)

( * ) Notice: Subject to any disclaimer, the term of this patent is extended or adjusted under 35 U.S.C. 154(b) by 416 days.

(21) Appl. No.: 14/148,693

(22) Filed: Jan. 6, 2014

(65) Prior Publication Data

US 2014/0192160 A1 Jul. 10, 2014

Related U.S. Application Data

(60) Provisional application No. 61/749,864, filed on Jan. 7, 2013.

(30) Foreign Application Priority Data

Dec. 19, 2013 (TW) .............................. 102147226 A (51) Int. Cl.
*H04N 13/00* (2006.01)
*H04N 5/235* (2006.01)
(Continued)

(52) U.S. Cl.
CPC ........... *H04N 5/2357* (2013.01); *G06F 3/017* (2013.01); *G06F 3/0304* (2013.01);
(Continued)

(58) Field of Classification Search
CPC ............. G06K 9/00389; G06K 9/2036; G06K 9/00355; G06K 9/2027; H04N 5/2357; G06F 3/0304; G06F 3/017
(Continued)

(56) References Cited

U.S. PATENT DOCUMENTS 5,598,000 A * 1/1997 Popat ........................ E06B 9/32
250/205
7,023,481 B1 * 4/2006 Watanabe .......... G06K 7/10841
257/E27.152
(Continued)

FOREIGN PATENT DOCUMENTS

CN 1297257 A 5/2001
CN 102334128 A 1/2012
(Continued)

OTHER PUBLICATIONS

Flicker fusion threshold—Wikipedia, the free encyclopedia. Accessed Jul. 6, 2012. https://web.archive.org/web/20120706052721/http://en.wikipedia.org/wiki/Flicker_fusion_threshold.*

*Primary Examiner* — Zhihan Zhou
(74) *Attorney, Agent, or Firm* — patenttm.us (57) ABSTRACT

A three-dimensional image sensing device includes a light source, a sensing module, and a signal processing module. The sensing module includes a pixel array, a control unit, and a light source driver. The light source generates flashing light with a K multiple of a frequency of flicker noise or a predetermined frequency. The pixel array samples the flashing light to generate a sampling result. The control unit
(Continued)

executes an image processing on the sampling result to generate a spectrum. The light source driver drives the light source according to the K multiple of the frequency or the predetermined frequency. The signal processing module generates the K multiple of the frequency according to the spectrum, or outputs the predetermined frequency to the light source driver, and generates depth information according to a plurality of first images/a plurality of second images during turning-on/turning-off of the light source included in the sampling result.

14 Claims, 9 Drawing Sheets

(51) Int. Cl.
 *G06F 3/03* (2006.01)
 *G06K 9/20* (2006.01)
 *G06F 3/01* (2006.01)
 *G06K 9/00* (2006.01)
(52) U.S. Cl.
 CPC ....... *G06K 9/00355* (2013.01); *G06K 9/2027* (2013.01); *G06K 9/2036* (2013.01)
(58) Field of Classification Search
 USPC .......................................................... 348/46
 See application file for complete search history.

(56) References Cited

U.S. PATENT DOCUMENTS

| | | | | |
|---|---|---|---|---|
| 2006/0268258 A1* | 11/2006 | Braig | ....................... | A61B 5/01 356/39 |
| 2007/0013871 A1* | 1/2007 | Marshall | ................ | H04N 9/312 353/20 |
| 2007/0081130 A1* | 4/2007 | May | ..................... | H04N 5/7416 353/85 |
| 2007/0085912 A1* | 4/2007 | Hakola | ................ | H04N 5/2351 348/227.1 |
| 2008/0165267 A1* | 7/2008 | Cok | ....................... | H04N 7/144 348/333.01 |
| 2010/0290674 A1 | 11/2010 | Kim | | |
| 2011/0292241 A1* | 12/2011 | Segapelli | ............. | H04N 5/2357 348/226.1 |
| 2011/0292255 A1* | 12/2011 | Kanade | .............. | H04N 5/23293 348/241 |
| 2012/0081569 A1* | 4/2012 | Yost | ..................... | H04N 5/2353 348/226.1 |
| 2012/0162390 A1* | 6/2012 | Chang | ................ | H04N 13/0271 348/49 |
| 2012/0188416 A1* | 7/2012 | Tsai | ....................... | G06F 3/0418 348/241 |
| 2012/0236174 A1* | 9/2012 | Kinrot | .................. | H04N 5/2357 348/226.1 |
| 2013/0093921 A1* | 4/2013 | Liao | ....................... | G06F 3/0418 348/234 |
| 2013/0343601 A1* | 12/2013 | Jia | ....................... | G06K 9/00355 382/103 |

FOREIGN PATENT DOCUMENTS

| | | |
|---|---|---|
| CN | 102741781 A | 10/2012 |
| GB | 2492848 A | 1/2013 |
| TW | 201028737 | 8/2010 |
| TW | 201227159 | 7/2012 |
| TW | 201227159 A | 7/2012 |
| TW | 201230773 A | 7/2012 |
| TW | 201249190 A | 12/2012 |

* cited by examiner

THREE-DIMENSIONAL IMAGE SENSING DEVICE AND METHOD OF SENSING THREE-DIMENSIONAL IMAGES

CROSS REFERENCE TO RELATED APPLICATIONS

This application claims the benefit of U.S. Provisional Application No. 61/749,864, filed on Jan. 7, 2013 and entitled "3D gesture sensor architecture," the contents of which are incorporated herein by reference.

BACKGROUND OF THE INVENTION

1. Field of the Invention

The present invention relates to a three-dimensional image sensing device and a method of sensing three-dimensional images, and particularly to a three-dimensional image sensing device and a method of sensing three-dimensional images that can utilize an K multiple of a frequency of flicker noise or a predetermined frequency to cancel noise of ambient visible light.

2. Description of the Prior Art

With advance of human-device interfaces for mobile devices, the human-device interfaces have a trend toward nature user interfaces (NUIs), wherein gesture recognition is one of the most important NUI technologies, and various two-dimensional image processing can be utilized to execute the gesture recognition. However, because two-dimensional image processors cannot determine depth of an image, gesture recognition capability of the two-dimensional image processors is significantly influenced. Therefore, it is a better method to utilize three-dimensional image sensing including depth information to execute the gesture recognition in the future.

In the three-dimensional image sensing including depth information, ambient visible light sensor (ALS) and proximity sensor (PS) are widely applied to most of mobile devices (e.g. smart phones or tablet personal computers). For a mobile device, space of a printed circuit board for installing new components will significantly increase cost of the mobile device, so any mobile device has a requirement of integrating a combination of ambient visible light sensor, proximity sensor, color temperature sensor, and temperature sensor with gesture recognition into the same integrated circuit. However, the prior art does not provide a proper integrated solution for a user.

SUMMARY OF THE INVENTION

An embodiment provides a three-dimensional image sensing device. The three-dimensional image sensing device includes a light source, a sensing module, and a signal processing module, wherein the sensing module includes a pixel array, a control unit, and a light source driver. The light source is used for generating flashing light with a K multiple of a frequency of flicker noise or a predetermined frequency, wherein K is a positive real number, and the flicker noise is generated by an alternating current source. The pixel array is used for sampling the flashing light to generate a sampling result, wherein the sampling result comprises a plurality of first images during turning-on of the light source and a plurality of second images during turning-off of the light source. The control unit is used for executing an image processing on the sampling result to generate a spectrum corresponding to the sampling result. The light source driver is used for driving the light source according to the K multiple of the frequency of flicker noise or the predetermined frequency. The signal processing module is coupled to the sensing module for generating the K multiple of the frequency according to the spectrum, and generating depth information according to the plurality of first images and the plurality of second images, wherein when the k multiple of the frequency is within a predetermined frequency range, the signal processing module outputs the K multiple of the frequency to the light source driver, or when the K multiple of the frequency is outside the predetermined frequency range, the signal processing module outputs the predetermined frequency to the light source driver.

Another embodiment provides a method of sensing three-dimensional images, wherein a three-dimensional image sensing device applied to the method comprises a light source, a sensing module, and a signal processing module. The method includes the sensing module driving the light source to generate flashing light with a K multiple of a frequency of flicker noise or a predetermined frequency according to the K multiple of the frequency or the predetermined frequency, wherein K is a positive real number, and the flicker noise is generated by an alternating current source; the sensing module sampling the flashing light to generate a sampling result, wherein the sampling result comprises a plurality of first images during turning-on of the light source and a plurality of second images during turning-off of the light source; the sensing module executing an image processing on the sampling result to generate a spectrum corresponding to the sampling result; the signal processing module directly outputting the predetermined frequency, or generating and outputting the K multiple of the frequency to the sensing module according to the spectrum; and the signal processing module generating depth information according to the plurality of first images and the plurality of second images.

The present invention provides a three-dimensional image sensing device and a method of sensing three-dimensional images. Compared to the prior art, because the three-dimensional image sensing device integrates a sensing module and a signal processing module into the same integrated circuit, the present invention has lower cost and is more efficient. In addition, because a light source can generates flashing light with an K multiple of a frequency of flicker noise or a predetermined frequency, the present invention can cancel flicker noise of ambient visible light, resulting in capabilities of depth sensing and gesture recognition of the present invention be increased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
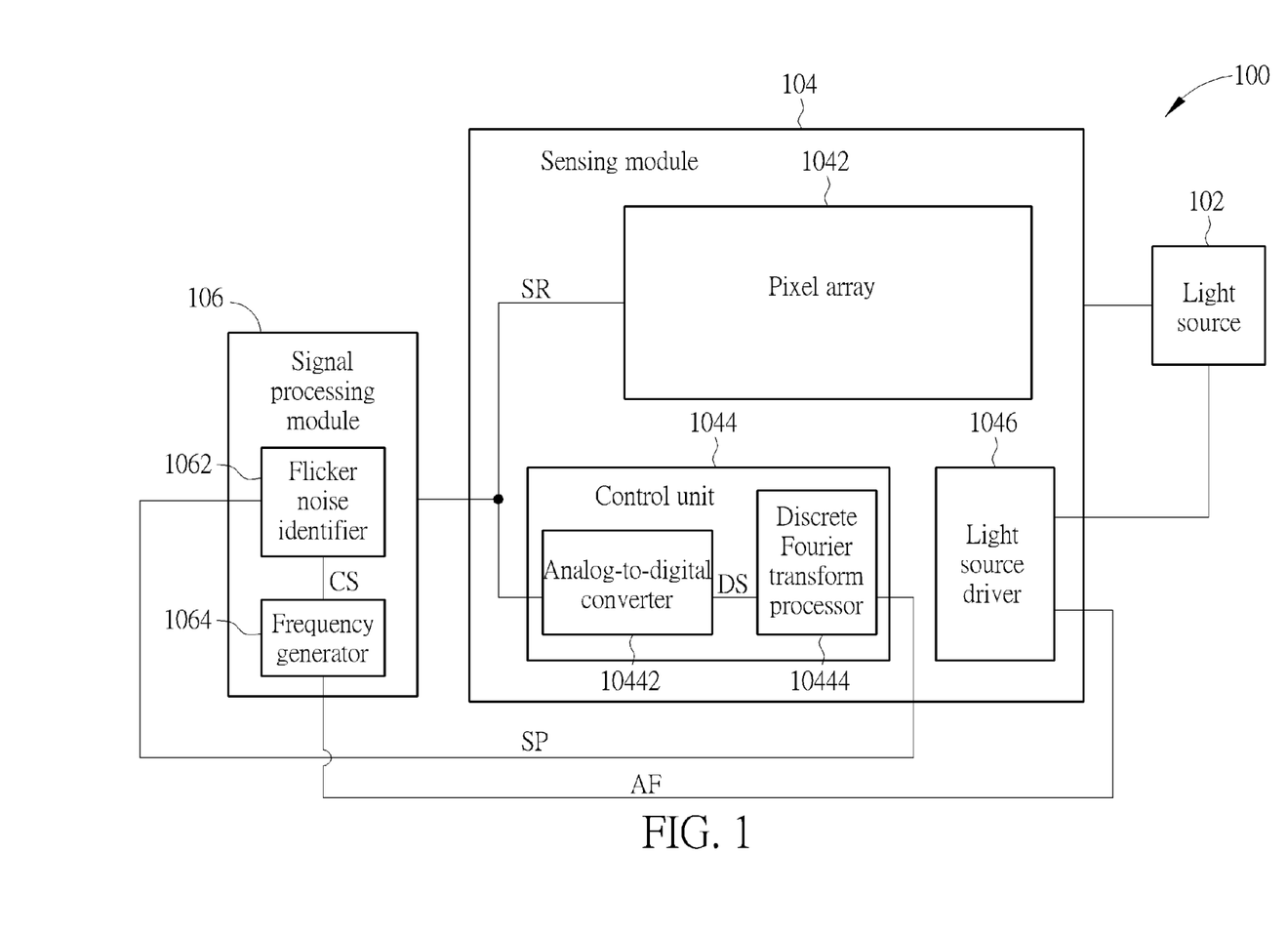
FIG. 1 is a diagram illustrating a three-dimensional image sensing device according to an embodiment.

Please refer to FIG. 1. FIG. 1 is a diagram illustrating a three-dimensional image sensing device 100 according to an embodiment. As shown in FIG. 1, the three-dimensional image sensing device 100 includes a light source 102, a sensing module 104, and a signal processing module 106, wherein the sensing module 104 includes a pixel array 1042, a control unit 1044, and a light source driver 1046, and the control unit 1044 includes an analog-to-digital converter 10442 and a discrete Fourier transform processor 10444. The light source 102 can be an infrared ray (IR) light source or an IR laser light source (e.g. an IR light-emitting diode or an IR laser diode), and is used for generating flashing light with a K multiple of a frequency AF of flicker noise (wherein the frequency of the flicker noise can be equal to 100 Hz or 120 Hz) or a predetermined frequency, wherein exposure time of the pixel array 1042 during turning on of the light source 102 is equal to exposure time of the pixel array 1042 during turning off of the light source 102, and K is a positive real number (e.g. K is N or $$\frac{1}{N},$$

wherein N is a positive integer greater than 1). But, in another embodiment of the present invention, the light source 102 is a visible light source. The pixel array 1042 is a G*H complementary metal-oxide-semiconductor (CMOS) image sensing pixel array, wherein G and H are positive integers. But, the present invention is not limited to the pixel array 1042 being a CMOS image sensing pixel array. That is to say, the pixel array 1042 can also be a charge-coupled device (CCD) image sensing pixel array. The pixel array 1042 includes an IR filter, so the pixel array 1042 can attenuate light except IR. In one embodiment of the present invention, wavelength of the flashing light generated by the light source 102 is 850 nm. When the light source 102 generates the flashing light with the K multiple of the frequency AF or the predetermined frequency, the pixel array 1042 of the sensing module 104 is used for sampling the flashing light generated by the light source 102 to generate a sampling result SR, wherein the sampling result SR generated by the pixel array 1042 includes a plurality of first images during turning-on of the light source 102 and a plurality of second images during turning-off of the light source 102, and the light source 102 and the pixel array 1042 can synchronize with a beginning of each frame. After the pixel array 1042 generates the sampling result SR, the control unit 1044 executes an image processing on the sampling result SR generated by the pixel array 1042 to generate a spectrum SP corresponding to the sampling result SR, wherein the spectrum SP corresponds to the plurality of second images during turning-off of the light source 102 within the sampling result SR. As shown in FIG. 1, the image processing executed by the control unit 1044 includes the analog-to-digital converter 10442 generating a digital signal DS according to the sampling result SR, and the discrete Fourier transform processor 10444 generating the spectrum SP corresponding to the sampling result SR according to the digital signal DS. In addition, the light source driver 1046 is used for generating square waves to turn on or turn off the light source 102 according to the K multiple of the frequency AF or the predetermined frequency, wherein the square waves generated by the light source driver 1046 has the K multiple of the frequency AF or the predetermined frequency.

Figure 2:
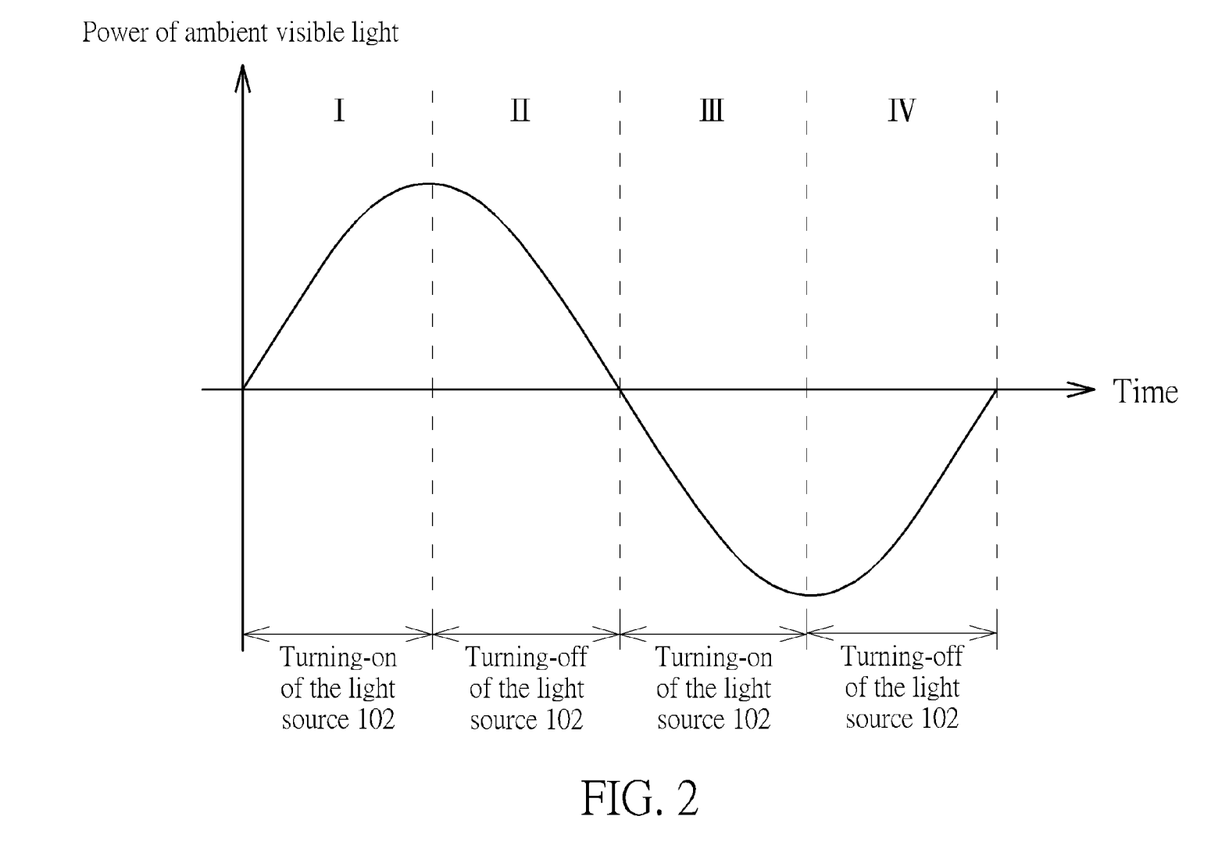
FIG. 2 and FIG. 3 are diagrams illustrating the signal processing module generating the depth information not influenced by ambient visible light when the light source generates the flashing light with the K multiple of the frequency of flicker noise or the predetermined frequency.

As shown in FIG. 1, the signal processing module 106 is coupled to the pixel array 1042 and the control unit 1044. Because the sampling result SR includes the plurality of first images during turning-on of the light source 102 and the plurality of second images during turning-off of the light source 102, the signal processing module 106 can generate depth information according to the plurality of first images during turning-on of the light source 102 and the plurality of second images during turning-off of the light source 102. That is to say, the signal processing module 106 utilizes each first image of the plurality of first images minus a corresponding second image of the plurality of second images to generate the depth information. Please refer to FIG. 2. FIG. 2 is a diagram illustrating the signal processing module 106 generating the depth information not influenced by ambient visible light when the light source 102 generates the flashing light with the K multiple of the frequency AF or the predetermined frequency. As shown in FIG. 2, when the flashing light has the K multiple of the frequency AF or the predetermined frequency, an area sum (block I and block III) corresponding to the ambient visible light (e.g. light generated by indoor sunlight lamps) generated by the signal processing module 106 according to the plurality of first images (during turning-on of the light source 102) is equal to an area sum (block II and block IV) corresponding to the ambient visible light generated by the signal processing module 106 according to the plurality of second images (during turning-off of the light source 102). Therefore, As shown in equation (1), the signal processing module 106 can cancel influence generated by the indoor sunlight lamps (100 Hz or 120 Hz) through the plurality of first images and the plurality of second images. As shown in equation (1), equation (1) is hold indifferent initial phase angles θ and different exposure times X. In addition, the depth information generated by the signal processing module 106 is inverse proportion to a distance between a user and the three-dimensional image sensing device 100.

$$\int_0^X \cos(t+\theta)\,dt + \int_\pi^{X+\pi} \cos(t+\theta)\,dt = \sin(t+\theta)\big|_0^X + \sin(t+\theta)\big|_\pi^{X+\pi} =$$

the light source 102 is turned on (1)

$$(\sin(X+\theta) - \sin\theta) + (-\sin(X+\theta) + \sin\theta) = 0$$

the light source 102 is turned off (2)

$$\int_{\pi/2}^{X+\pi/2} \cos(t+\theta)\,dt + \int_{3\pi/2}^{X+3\pi/2} \cos(t+\theta)\,dt =$$

$$\sin(t+\theta)\big|_{\pi/2}^{X+\pi/2} + \sin(t+\theta)\big|_{3\pi/2}^{X+3\pi/2} =$$

$$(\cos(X+\theta) - \cos\theta) + (-\cos(X+\theta) + \cos\theta) = 0,\ 0 < X < \Pi/2$$

In addition, equation (2) is a general formula corresponding to equation (1):

$$\text{the light source 102 is turned on} \quad (2)$$

$$\int_{0+2\pi^*1/K+\theta}^{X1+2\pi^*1/K+\theta} \cos(t)\,dt +$$

$$\int_{0+2\pi^*2/K+\theta}^{X1+2\pi^*2/K+\theta} \cos(t)\,dt + \ldots + \int_{0+2\pi^*K/K+\theta}^{X1+2\pi^*K/K+\theta} \cos(t)\,dt =$$

$$\sin(t)\Big|_{0+2\pi^*1/K+\theta}^{X1+2\pi^*1/K+\theta} + \sin(t)\Big|_{0+2\pi^*2/K+\theta}^{X1+2\pi^*2/K+\theta} + \ldots + \sin(t)\Big|_{0+2\pi^*K/K+\theta}^{X1+2\pi^*K/K+\theta} = 0$$

the light source 102 is turned off $$\int_{0+2\pi^*1/K+\theta}^{X2+2\pi^*1/K+\theta} \cos(t)\,dt +$$

$$\int_{0+2\pi^*2/K+\theta}^{X2+2\pi^*2/K+\theta} \cos(t)\,dt + \ldots + \int_{0+2\pi^*K/K+\theta}^{X2+2\pi^*K/K+\theta} \cos(t)\,dt =$$

$$\sin(t)\Big|_{0+2\pi^*1/K+\theta}^{X2+2\pi^*1/K-\theta} + \sin(t)\Big|_{0+2\pi^*2/K+\theta}^{X2+2\pi^*2/K+\theta} + \ldots + \sin(t)\Big|_{0+2\pi^*K/K+\theta}^{X2+2\pi^*K/K+\theta} = 0$$

Figure 3:
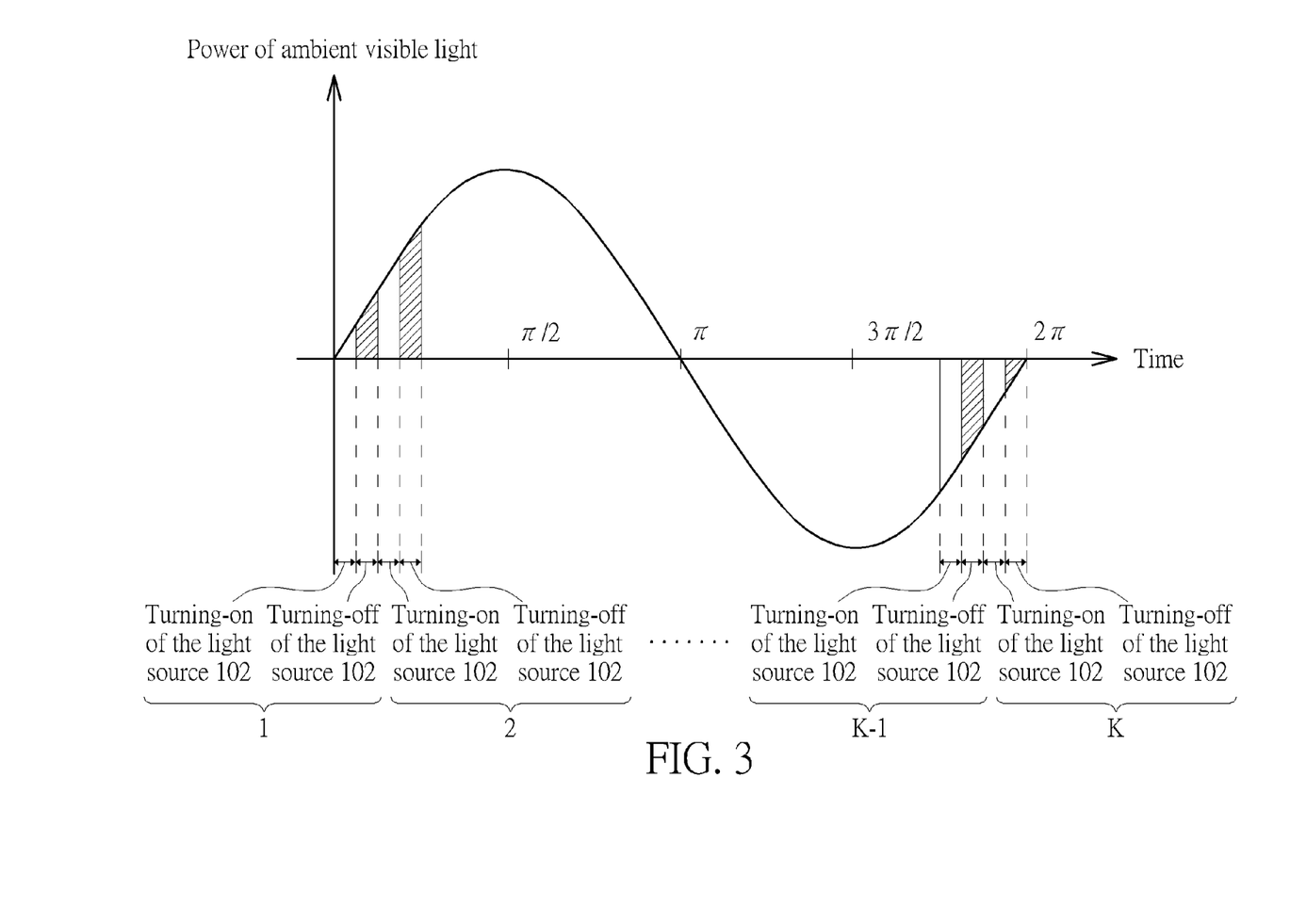

As shown in equation (2) and FIG. 3, X1 is exposure time during turning-on of the light source 102, X2 is exposure time during turning-off of the light source 102, and θ is an initial phase angle, wherein K can be N or $$\frac{1}{N},$$

N is a positive integer greater than 1, and K*(X1+X2) is less than or equal to 1/120 Hz or 1/100 Hz.

As shown in FIG. 1, the signal processing module 106 includes a flicker noise identifier 1062 and a frequency generator 1064, wherein the frequency generator 1064 is a delay time oscillator, a resistor-capacitor oscillator, a phase locked loop, a crystal oscillator, a resonator, or a frequency divider. The flicker noise identifier 1062 is used for determining flicker noise corresponding to two multiple of an alternating current frequency according to the spectrum SP, and generating a control signal CS corresponding to the K multiple of the frequency AF according to the flicker noise corresponding to the two multiple of the alternating current frequency. The frequency generator 1064 is coupled to the flicker noise identifier 1062 for generating the K multiple of the frequency AF to the light source driver 1046 according to the control signal CS, wherein the K multiple of the frequency AF generated by the frequency generator 1064 is within a predetermined frequency range. In addition, when the K multiple of the frequency AF generated by the frequency generator 1064 is outside the predetermined frequency range, the frequency generator 1064 directly outputs the predetermined frequency to the light source driver 1046.

Figure 4:
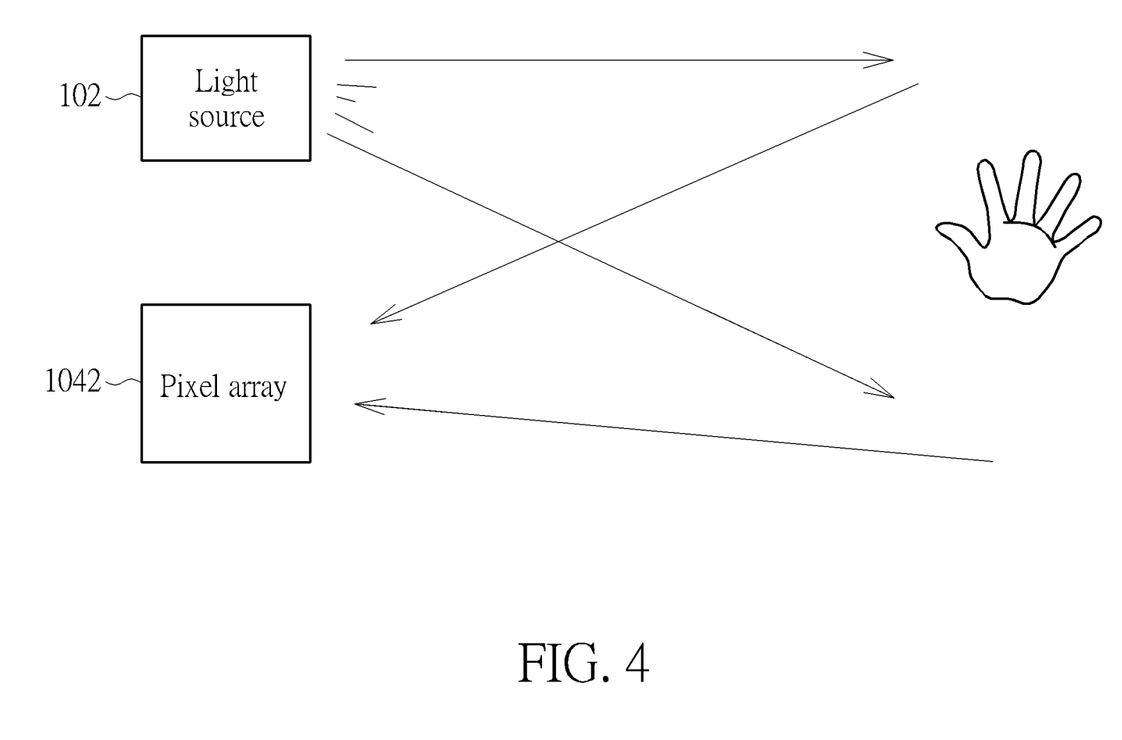
FIG. 4 is a diagram illustrating the signal processing module utilizing the flashing light with the K multiple of the frequency or the predetermined frequency generated by the light source to determine a gesture of the user.

Please refer to FIG. 4. FIG. 4 is a diagram illustrating the signal processing module 106 utilizing the flashing light with the K multiple of the frequency AF or the predetermined frequency generated by the light source 102 to determine a gesture of the user. As shown in FIG. 4, when the light source 102 generates the flashing light with the K multiple of the frequency AF or the predetermined frequency, the signal processing module 106 can utilize each first image of the plurality of first images generated by the pixel array 1042 minus a corresponding second image of the plurality of second images generated by the pixel array 1042 to generate the depth information. Then, the signal processing module 106 can determine the gesture of the user through the depth information.

Figure 5:
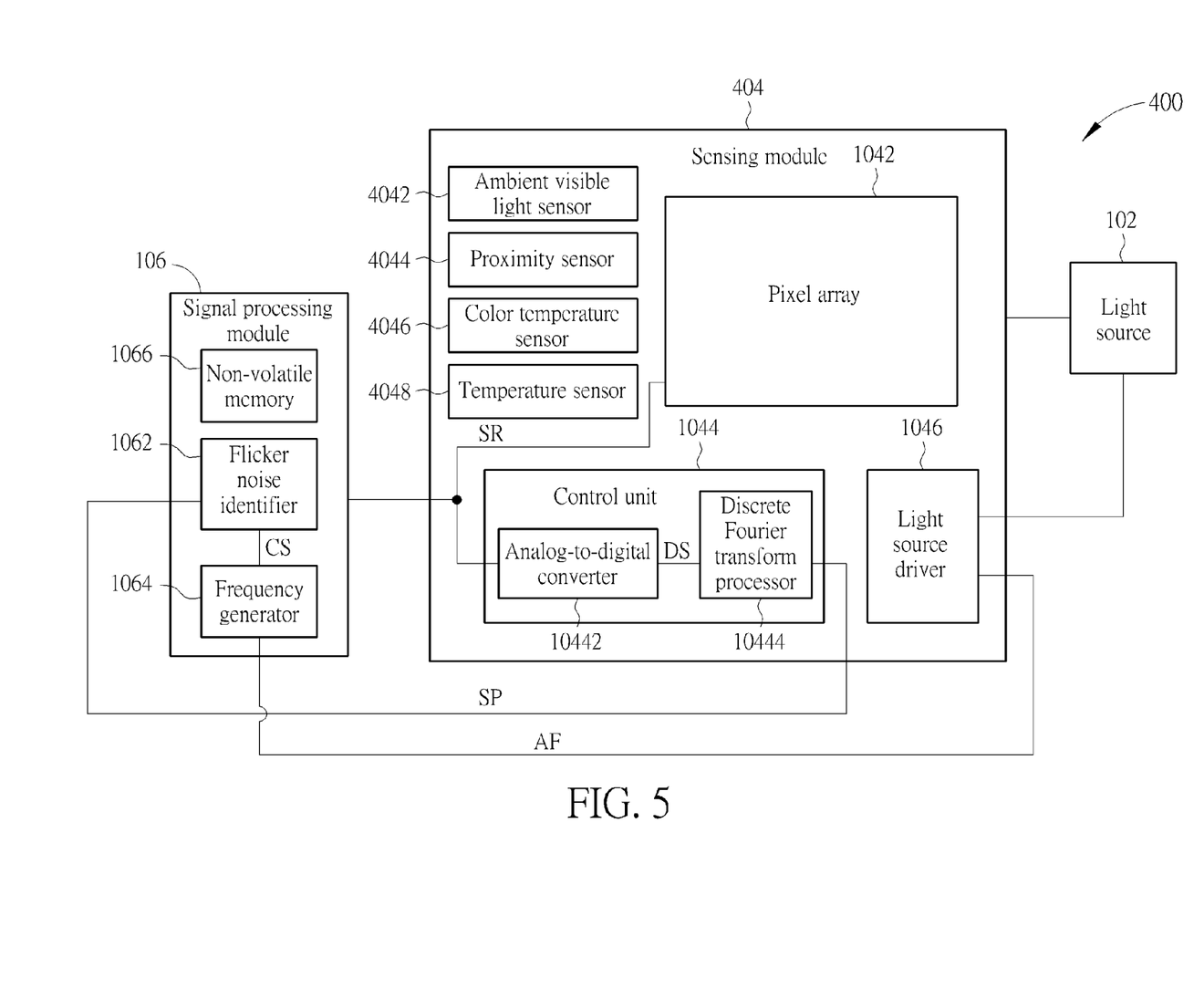
FIG. 5 is a diagram illustrating a three-dimensional image sensing device according to another embodiment.

Please refer to FIG. 5. FIG. 5 is a diagram illustrating a three-dimensional image sensing device 400 according to another embodiment. As shown in FIG. 5, a difference between the three-dimensional image sensing device 400 and the three-dimensional image sensing device 100 is that a sensing module 404 of the three-dimensional image sensing device 400 further includes an ambient visible light sensor 4042, a proximity sensor 4044, a color temperature sensor 4046, and a temperature sensor 4048. Therefore, the sensing module 404 integrating the ambient visible light sensor 4042, the proximity sensor 4044, the color temperature sensor 4046, and the temperature sensor 4048 has fewer component count, smaller board space allocation, and lower cost. In addition, because the sensing module 404 integrates the ambient visible light sensor 4042, the proximity sensor 4044, the color temperature sensor 4046, and the temperature sensor 4048, capabilities of depth sensing and gesture recognition of the signal processing module 106 of the three-dimensional image sensing device 400 can be increased.

When ambient visible light is sufficient and the light source 102 is turned off, a sampling result SR generated by the pixel array 1042 can generate a contour of an object through ambient visible light. On the contrary, when ambient visible light is dimmed, the light source 102 needs to be turned on to make the pixel array 1042 generate the sampling result SR for depth sensing and gesture recognition. Therefore, the ambient visible light sensor 4042 can make a duty cycle of the light source 102 be adjusted dynamically. Thus, the three-dimensional image sensing device 400 can further reduce turning-on time of the light source 102 and optimize total power consumption of depth sensing and gesture recognition of the signal processing module 106 of the three-dimensional image sensing device 400. However, In most cases, the signal processing module 106 still generates the depth information according to the plurality of first images during turning-on of the light source 102 and the plurality of second images during turning-off of the light source 102, wherein the depth information is very useful for the signal processing module 106 to differentiate the object from a back-ground of the object.

The proximity sensor 4044 can detect an average distance between the object and the proximity sensor 4044 according to turning-on and turning-off of the light source 102. Because the proximity sensor 4044 can be used for detecting the average distance between the object and the proximity sensor 4044, the proximity sensor 4044 can make total power consumption of the three-dimensional image sensing device 400 be less and have faster response time.

In one embodiment of the present invention, IR block and color filter coatings are incorporated in the color temperature sensor 4046, wherein the color temperature sensor 4046 can measure the ambient visible light through a spectrum corresponding to the IR block and color filter coatings. Generally speaking, the IR block and color filter coatings can block IR light with wavelength above 700 nm. In addition, the color temperature sensor 4046 can detect color temperature of the ambient visible light, wherein the color temperature of the ambient visible light can be applied to dynamically adjusting white balance of a display device and enhancing image quality of an image capture device.

The temperature sensor 4048 is used for measuring a temperature of an environment surrounding the three-dimensional image sensing device 400. However, measuring the temperature of the environment surrounding the three-dimensional image sensing device 400 can also be applied to temperature compensation of the ambient visible light and color measurement. As shown in FIG. 5, the signal processing module 106 has a non-volatile memory (e.g. a flash memory) 1066. The signal processing module 106 can execute gesture recognition according to differences between features extracted from a current sampling result SR and pre-recorded features stored in the non-volatile memory 1066. When the differences between the features extracted from the current sampling result SR and the pre-recorded features stored in the non-volatile memory 1066 are small enough, the signal processing module 106 can obtain positive recognition.

Figure 6:
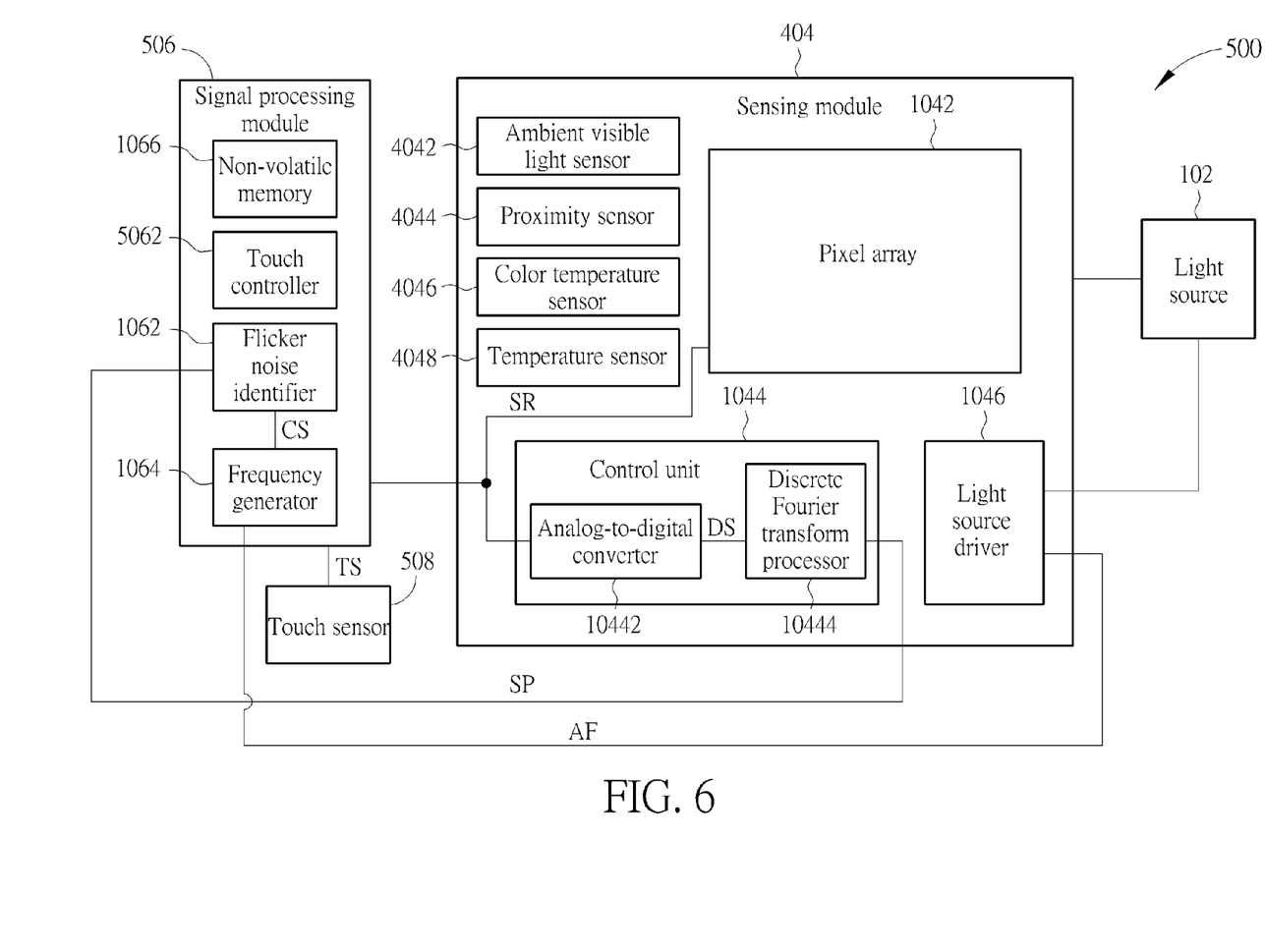
FIG. 6 is a diagram illustrating a three-dimensional image sensing device according to another embodiment.

Please refer to FIG. 6. FIG. 6 is a diagram illustrating a three-dimensional image sensing device 500 according to another embodiment. As shown in FIG. 6, a difference between the three-dimensional image sensing device 500 and the three-dimensional image sensing device 400 is that a signal processing module 506 of the three-dimensional image sensing device 500 further includes a touch controller 5062. A benefit of integrating gesture recognition with the touch controller 5062 is a lower integrated circuit cost.

In addition, the three-dimensional image sensing device 500 has advantages as follows. First, the touch controller 5062 is primarily used for dealing with a signal TS generated by a touch sensor 508, wherein the signal TS generated by the touch sensor 508 can represent a location of an object (e.g. a finger) touching a touch panel or a location of the touch panel near the object (not touching the touch panel). The pixel array 1042 is used for generating a pointing direction of the object. Therefore, regardless of whether the object touches or is away from the touch panel, a combination of touch and gesture processor can make a user to track an icon on the touch panel. Second, in one embodiment of the present invention, when a finger of the user is touching an icon of a display panel, the other hand of the user can execute a three-dimensional gesture to manipulate the touched icon on the display panel. For example, one building of a map displayed by a display panel can be identified by the user touching the building, and then a three-dimensional gesture of the other hand of the user can execute a command on a direction (e.g. up, down, left, right, zoom in and zoom out) which the user wants to move corresponding to the building of the map, or a viewing direction of the building of the map.

Figure 7:
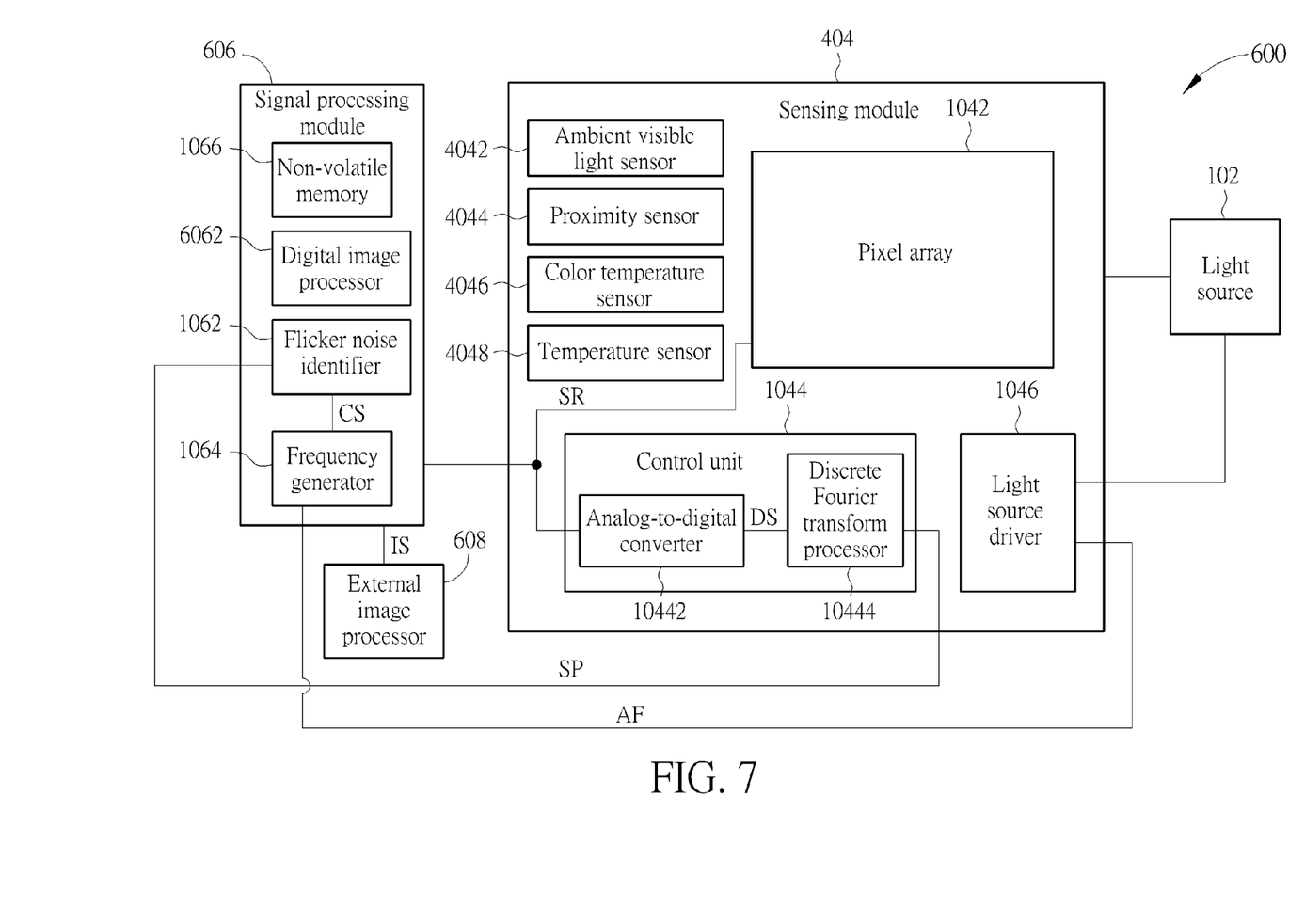
FIG. 7 is a diagram illustrating a three-dimensional image sensing device according to another embodiment.

Please refer to FIG. 7. FIG. 7 is a diagram illustrating a three-dimensional image sensing device 600 according to another embodiment. As shown in FIG. 7, a difference between the three-dimensional image sensing device 600 and the three-dimensional image sensing device 400 is that a signal processing module 606 of the three-dimensional image sensing device 600 further includes a digital image processor 6062. As shown in FIG. 7, an external image processor 608 can be used for capturing a two-dimensional red-green-blue (RGB) image IS of an object. In addition, the digital image processor 6062 includes some normal image processing functions (e.g. image compression, hand vibration removal, and so on).

In addition, the three-dimensional image sensing device 600 has advantages as follows. First, the signal processing module 606 not only can utilize depth information, but can also utilize the two-dimensional RGB image IS to execute gesture recognition. Because an RGB image sensor of the external image processor 608 has higher resolution, the signal processing module 606 can differentiate an object from a back-ground corresponding to the object more efficiently. In addition, the overlap between the depth information and the two-dimensional RGB image IS can significantly enhance accuracy of extracted features. Second, when a user is in a special case (e.g. the user wears black finger gloves), the black finger gloves can attenuate IR reflection from fingers of the user. However, the RGB image sensor of the external image processor 608 is capable of differentiating the black finger gloves from back-ground clothes. Therefore, a complimentary effect between the RGB image sensor of the external image processor 608 and an IR sensor of the pixel array 1042 can enhance accuracy of a gesture recognition capability of the three-dimensional image sensing device 600.

Figure 8:
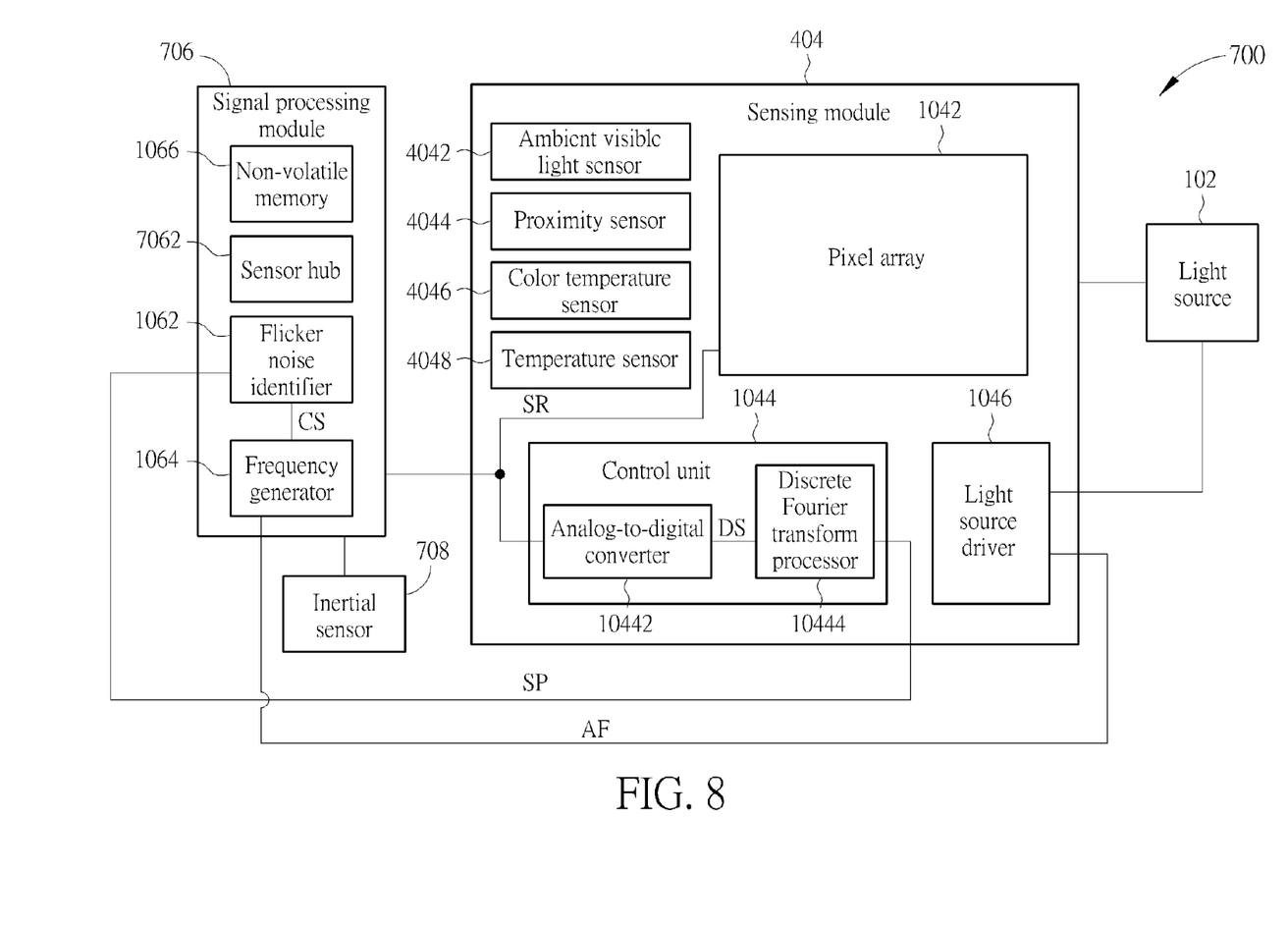
FIG. 8 is a diagram illustrating a three-dimensional image sensing device according to another embodiment.

Please refer to FIG. 8. FIG. 8 is a diagram illustrating a three-dimensional image sensing device 700 according to another embodiment. As shown in FIG. 8, a difference between the three-dimensional image sensing device 700 and the three-dimensional image sensing device 400 is that a signal processing module 706 of three-dimensional image sensing device 700 includes a sensor hub 7062 of an inertial sensor 708, wherein the inertial sensor 708 includes at least one micro electro mechanical systems (MEMS) accelerometer, at least one gyroscope, at least one magnetometer, and at least one altitude sensor. The inertial sensor 708 is used for being an inertial measurement unit (IMU), wherein the inertial measurement unit is very important for indoor navigation. Because the signal processing module 706 integrates the sensor hub 7062 of the inertial sensor 708 and a gesture processor, the signal processing module 706 is a more efficient integrated circuit.

In addition, the three-dimensional image sensing device 700 has advantages as follows. First, the sensor hub 7062 of the inertial sensor 708 can recognize a location, an orientation, and an inclination of a user holding the three-dimensional image sensing device 700. As shown in FIG. 8, the sensing module 404 includes the ambient visible light sensor 4042, the proximity sensor 4044, the color temperature sensor 4046, and the temperature sensor 4048. Therefore, the location and a surrounding environment of the user can be recognized by the three-dimensional image sensing device 700, and many applications can be generated according to the location and the surrounding environment of the user. Second, the user can move the mobile device including the three-dimensional image sensing device 700 around himself/herself, so the three-dimensional image sensing device 700 can measure a direction of the mobile device through the at least one gyroscope and the at least one magnetometer. Then, the signal processing module 706 can rebuild a three-dimensional image of the user. In another embodiment of the present invention, measurement of inclination and/or orientation of the inertial measurement unit (the inertial sensor 708) can help the mobile device to detect change of viewing direction of the mobile device. Because the mobile device can move away from a detection angle or a detection range of the pixel array 1042, the inertial measurement unit (the inertial sensor 708) and the gesture processor can alarm the user to keep a gesture within the detection angle or the detection range of the pixel array 1042.

In addition, the three-dimensional image sensing devices 100, 400, 500, 600, 700 is not limited to determining a gesture of a user, that is, the three-dimensional image sensing devices 100, 400, 500, 600, 700 can also recognize fingers, bakes of hands, or eyes of the user, or execute object recognition.

Figure 9:
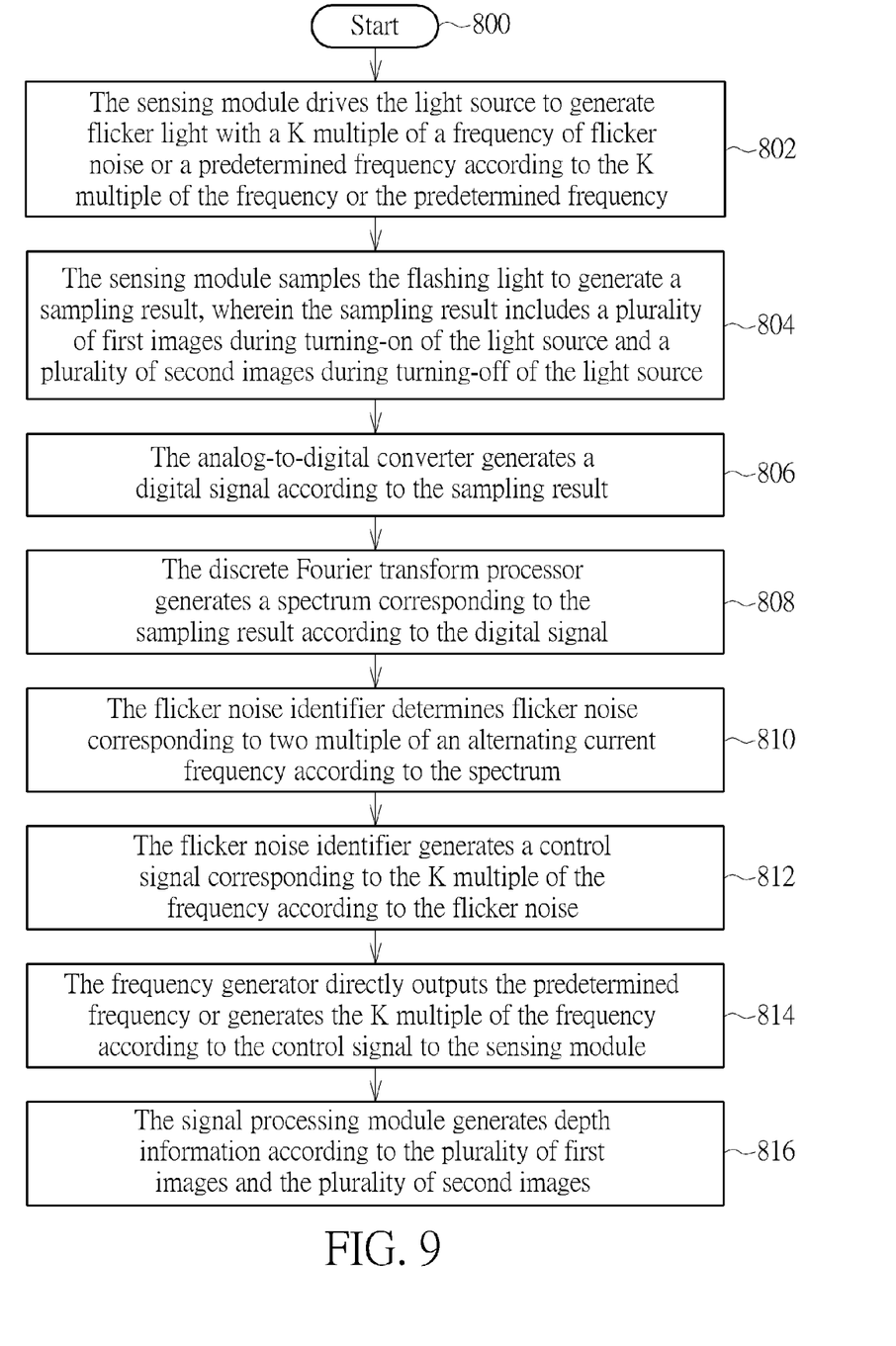
FIG. 9 is a flowchart illustrating a method of sensing three-dimensional images according to another embodiment.

Please refer to FIG. 1, FIG. 2, FIG. 4, and FIG. 9. FIG. 9 is a flowchart illustrating a method of sensing three-dimensional images according to another embodiment. The method in FIG. 9 is illustrated using the three-dimensional image sensing device 100 in FIG. 1. Detailed steps are as follows:

Step 800: Start.

Step 802: The sensing module 104 drives the light source 102 to generate flashing light with a K multiple of a frequency AF of flicker noise or a predetermined frequency according to the K multiple of the frequency AF or the predetermined frequency.

Step 804: The sensing module 104 samples the flashing light to generate a sampling result SR, wherein the sampling result SR includes a plurality of first images during turning-on of the light source 102 and a plurality of second images during turning-off of the light source 102.

Step 806: The analog-to-digital converter 10442 generates a digital signal DS according to the sampling result SR.

Step 808: The discrete Fourier transform processor 10444 generates a spectrum SP corresponding to the sampling result SR according to the digital signal DS.

Step 810: The flicker noise identifier 1062 determines flicker noise corresponding to two multiple of an alternating current frequency according to the spectrum SP.

Step 812: The flicker noise identifier 1062 generates a control signal CS corresponding to the K multiple of the frequency AF according to the flicker noise.

Step 814: The frequency generator 1064 directly outputs the predetermined frequency or generates the K multiple of the frequency AF according to the control signal CS to the sensing module 104.

Step 816: The signal processing module 106 generates depth information according to the plurality of first images and the plurality of second images.

In Step 802, the light source driver 1046 of the sensing module 104 is used for generating square waves to turn on or turn off the light source 102 according to the K multiple of the frequency AF or the predetermined frequency, wherein the square waves generated by the light source driver 1046 has the K multiple of the frequency AF or the predetermined frequency. In addition, the light source 102 is an IR light source or an IR laser light source (e.g. an IR light-emitting diode or an IR laser diode), and is used for generating flashing light with the K multiple of the frequency AF or the predetermined frequency, wherein exposure time of the pixel array 1042 during turning on of the light source 102 is equal to exposure time of the pixel array 1042 during turning off of the light source 102, and K is a positive real number (e.g. K is N or $$\frac{1}{N},$$

wherein N is a positive integer greater than 1). In Step 804, when the light source 102 generates the flashing light with the K multiple of the frequency AF or the predetermined frequency, the pixel array 1042 of the sensing module 104 is used for sampling the flashing light generated by the light source 102 to generate the sampling result SR, wherein the light source 102 and the pixel array 1042 can synchronize with a beginning of each frame. In Step 806, after the pixel array 1042 generates the sampling result SR, the analog-to-digital converter 10442 of the control unit 1044 can generate the digital signal DS according to the sampling result SR generated by the pixel array 1042, and in Step 808, the discrete Fourier transform processor 10444 of the control unit 1044 can generate the spectrum SP corresponding to the sampling result SR generated by the pixel array 1042 according to the digital signal DS generated by the analog-to-digital converter 10442, wherein the spectrum SP corresponds to the plurality of second images during turning-off of the light source 102 within the sampling result SR.

In Step 810 and Step 812, the flicker noise identifier 1062 of the signal processing module 106 is used for determining the flicker noise corresponding to two multiple of an alternating current frequency according to the spectrum SP, and generating the control signal CS corresponding to the K multiple of the frequency AF according to the flicker noise corresponding to the two multiple of the alternating current frequency. In Step 814, the frequency generator 1064 of the signal processing module 106 generates the K multiple of the frequency AF to the light source driver 1046 of the sensing module 104 according to the control signal CS, wherein the K multiple of the frequency AF generated by the frequency generator 1064 is within a predetermined frequency range. In addition, when the K multiple of the frequency AF generated by the frequency generator 1064 is outside the predetermined frequency range, the frequency generator 1064 directly outputs a predetermined frequency within the predetermined frequency range to the light source driver 1046.

In Step 816, as shown in FIG. 1, because the sampling result SR generated by the pixel array 1042 includes the plurality of first images during turning-on of the light source 102 and the plurality of second images during turning-off of the light source 102, the signal processing module 106 can generate the depth information according to the plurality of first images during turning-on of the light source 102 and the plurality of second images during turning-off of the light source 102. That is to say, the signal processing module 106 utilizes each first image of the plurality of first images minus a corresponding second image of the plurality of second images to generate the depth information.

In addition, as shown in FIG. 4, when the light source 102 generates the flashing light with the K multiple of the frequency AF or the predetermined frequency, the signal processing module 106 can utilize each first image of the plurality of first images generated by the pixel array 1042 minus a corresponding second image of the plurality of second images generated by the pixel array 1042 to generate the depth information. Then, the signal processing module 106 can determine a gesture of a user through the depth information.

To sum up, compared to the prior art, because the three-dimensional image sensing device provided by the present invention integrates the sensing module and the signal processing module into the same integrated circuit, the present invention has lower cost and is more efficient. In addition, because the light source can generates flashing light with an integer multiple of a frequency of flicker noise or a predetermined frequency, the present invention can cancel noise of ambient visible light, resulting in capabilities of depth sensing and gesture recognition of the present invention be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A three-dimensional image sensing device, comprising:
   a light source for generating flashing light with a K multiple of a frequency of flicker noise or a predetermined frequency, wherein K is a positive real number, and the flicker noise is generated by an alternating current source;
a sensing module, comprising:
   a pixel array for sampling the flashing light and an ambient visible light to generate a sampling result, wherein the sampling result comprises a plurality of first images during turning-on of the light source and a plurality of second images during turning-off of the light source;
   a control circuit coupled to the pixel array to execute an image processing on the sampling result to generate a spectrum corresponding to the plurality of second images of the sampling result; and
   a light source driver circuit coupled to the light source that drives the light source; and
a signal processing circuit having an output terminal coupled to the light source driver circuit of the sensing module and an input terminal coupled to the control circuit of the sensing module generating the K multiple of the frequency according to the spectrum, wherein the light source driver circuit drives the light source to generate the flashing light with the K multiple of the frequency related to the spectrum, wherein in one period of the sampling result corresponding to the ambient visible light has a positive half period and a negative half period, the positive half period of the sampling result is divided into K/2 first positive areas corresponding to the first images and K/2 second positive areas corresponding to the second images, and the negative half period of the ambient visible light is divided into K/2 first negative areas corresponding to the first images and K/2 second negative areas corresponding to the second images, the K/2 first positive areas and the K/2 second positive areas are alternate in the positive half period of the sampling result, and the K/2 first negative areas and the K/2 second negative areas are alternate negative half period of the sampling result; wherein when the pixel array samples the flash light with the K multiple of frequency and the ambient visible light, the signal processing circuit calculates a sum of the K/2 first positive areas and K/2 first negative areas and the sum is 0; or the signal processing circuit calculates a sum of the K/2 second positive areas and K/2 second negative areas and the sum is 0, and
when the K multiple of the frequency of flicker noise is within a predetermined frequency range, the signal processing circuit outputs the K multiple of the frequency of flicker noise to the light source driver circuit, and when the K multiple of the frequency of flicker noise is out of the predetermined frequency range, the signal processing circuit outputs the predetermined frequency to the light source driver circuit.

2. The three-dimensional image sensing device of claim 1, wherein the light source is an infrared ray light source or an infrared ray laser light source.

3. The three-dimensional image sensing device of claim 1, wherein the control circuit comprises:
   an analog-to-digital converter for generating a digital signal according to the sampling result; and
   a discrete Fourier transform processor for generating the spectrum corresponding to the sampling result according to the digital signal.

4. The three-dimensional image sensing device of claim 1, wherein the signal processing circuit comprises a flicker noise identifier circuit and a frequency generator coupled to the flicker noise identifier circuit, wherein:
   the flicker noise identifier circuit determines the flicker noise corresponding to K multiple of an alternating current frequency according to the spectrum, and generates a control signal corresponding to the K multiple of the frequency according to the flicker noise; and
   the frequency generator generates the K multiple of the frequency according to the control signal.

5. The three-dimensional image sensing device of claim 4, wherein the frequency generator is a delay time oscillator, a resistor-capacitor oscillator, a phase locked loop, a crystal oscillator, a resonator, or a frequency divider.

6. The three-dimensional image sensing device of claim 1, wherein exposure time of the pixel array during turning on of the light source is equal to exposure time of the pixel array during turning off of the light source.

7. The three-dimensional image sensing device of claim 1, wherein the signal processing circuit is further used for determining a gesture of a user according to a first image of the plurality of first images and a second image of the plurality of second images corresponding to the first image.

8. The three-dimensional image sensing device of claim 1, wherein the sensing module further comprises:
   an infrared ray filter for attenuating light except infrared ray.

9. The three-dimensional image sensing device of claim 1, wherein K is N or $$\frac{1}{N},$$

and N is an even number equal to or greater than 4.

10. A method of sensing three-dimensional images, wherein a three-dimensional image sensing device applied to the method comprises a light source, a sensing module, and a signal processing circuit, the method comprising:
   the sensing module driving the light source to generate flashing light with a K multiple of a frequency of flicker noise or a predetermined frequency according to the K multiple of the frequency or the predetermined frequency, wherein K is a positive real number, and the flicker noise is generated by an alternating current source;
   the sensing module sampling the flashing light and an ambient visible light to generate a sampling result, wherein the sampling result comprises a plurality of first images during turning-on of the light source and a plurality of second images during turning-off of the light source;
   the sensing module executing an image processing on the sampling result to generate a spectrum corresponding to the plurality of second images of the sampling result; and
   the signal processing circuit generating and outputting the K multiple of the frequency to the sensing module according to the spectrum to drive the light source to generate the flashing light with the K multiple of the frequency, wherein in one period of the sampling result corresponding to the ambient visible light has a positive half period and a negative half period, the positive half period of the sampling result is divided into K/2 first positive areas corresponding to the first images and K/2 second positive areas corresponding to the second images, and the negative half period of the ambient visible light is divided into K/2 first negative areas corresponding to the first images and K/2 second negative areas corresponding to the second images, the K/2 first positive areas and the K/2 second positive areas are alternate in the positive half period of the sampling result, and the K/2 first negative areas and the K/2 second negative areas are alternate negative half period of the sampling result; wherein when the sensing module samples the flash light with the K multiple of frequency and the ambient visible light, the signal processing circuit calculates a sum of the K/2 first positive areas and K/2 first negative areas and the sum is 0; or the signal processing circuit calculates a sum of the K/2 second positive areas and K/2 second negative areas and the sum is 0, and wherein when the K multiple of the frequency of flicker noise is within a predetermined frequency range, the signal processing circuit outputs the K multiple of the frequency of flicker noise to a light source driver, and when the K multiple of the frequency of flicker noise is out of the predetermined frequency range, the signal processing circuit outputs the predetermined frequency to the light source driver.

11. The method of claim 10, wherein the sensing module executing the image processing on the sampling result to generate the spectrum corresponding to the plurality of second images of the sampling result comprises:

generating a digital signal according to the plurality of second images of the sampling result; and generating the spectrum corresponding to the plurality of second images of the sampling result according to the digital signal.

12. The method of claim 10, wherein the signal processing circuit generating and outputting the K multiple of the frequency to the sensing module according to the spectrum comprises:

determining the flicker noise corresponding to K multiple of an alternating current frequency according to the spectrum;

generating a control signal corresponding to the K multiple of the frequency according to the flicker noise; and generating and outputting the K multiple of the frequency to the sensing module according to the control signal.

13. The method of claim 10, wherein exposure time of a pixel array during turning on of the light source is equal to exposure time of the pixel array during turning off of the light source.

14. The method of claim 10, wherein K is N or $$\frac{1}{N},$$

and N is an even number and equal to or greater than 4.

* * * * *